(12) United States Patent
Aiello et al.

(10) Patent No.: US 11,310,225 B2
(45) Date of Patent: Apr. 19, 2022

(54) ACCESS TO TELECOM BLOCKCHAIN-BASED SERVICES WITH DIGITAL PASSPORT

(71) Applicant: Hewlett Packard Enterprise Development LP, Houston, TX (US)

(72) Inventors: Fabio Aiello, Rome (IT); Laura Meneghin, Rome (IT); Sabatino Foresta, Rome (IT)

(73) Assignee: Hewlett Packard Enterprise Development LP, Houston, TX (US)

( * ) Notice: Subject to any disclaimer, the term of this patent is extended or adjusted under 35 U.S.C. 154(b) by 421 days.

(21) Appl. No.: 16/171,989

(22) Filed: Oct. 26, 2018

(65) Prior Publication Data

US 2020/0137045 A1    Apr. 30, 2020

(51) Int. Cl.
*H04L 29/06* (2006.01)
*H04L 9/08* (2006.01)
*G06F 16/27* (2019.01)

(52) U.S. Cl.
CPC .......... *H04L 63/0853* (2013.01); *G06F 16/27* (2019.01); *H04L 9/0861* (2013.01);
(Continued)

(58) Field of Classification Search
CPC ....... H04W 12/45; H04W 12/40; H04W 4/50; H04W 4/60; H04W 8/18; H04W 8/20;
(Continued)

(56) References Cited

U.S. PATENT DOCUMENTS

| 9,100,175 B2 | 8/2015 | Nix et al. |
| 9,231,931 B2 | 1/2016 | Park et al. |

(Continued)

FOREIGN PATENT DOCUMENTS

| CN | 107820238 | 3/2018 |
| EP | 3284213 A1 | 2/2018 |

(Continued)

OTHER PUBLICATIONS

Ian Smith, "Embedded SIM Remote Provisioning Architecture", Version 1.1, GSM Association, Dec. 17, 2013, pp. 1-84.
(Continued)

*Primary Examiner* — Fatoumata Traore
*Assistant Examiner* — Thomas A Gyorfi
(74) *Attorney, Agent, or Firm* — Sheppard Mullin Richter & Hampton LLP (57) ABSTRACT

The disclosure relates to user-centric access to blockchain-based services accessed through a telecom network. User devices may each include a Digital Passport Application ("DPA"), which may be stored at an eSIM of the user device. The DPA may be directed to and anchor to an Edge Digital Gate ("EDG") entitled to provide access to blockchain-based services. The DPA may store a digital persona that digitally represents an entity such as a user or machine so that the DPA may access and interact with blockchain-based services on behalf of the entity. For instance, the digital persona may bind a physical identity of the entity with a digital identity through a private key of the entity. The private key may be used to digitally signed the access token. The digital persona may further link the digital identity with one or more (typically multiple) virtual identities each associated with a blockchain-based service.

20 Claims, 10 Drawing Sheets

(52) U.S. Cl.
CPC ...... *H04L 63/0807* (2013.01); *H04L 63/0876* (2013.01); *H04L 2209/38* (2013.01)

(58) Field of Classification Search
CPC ... H04W 12/04; H04W 12/06; H04W 12/068; H04L 63/0853; H04L 9/0861; H04L 63/0807; H04L 63/0876; H04L 2209/38; G06F 16/27

See application file for complete search history.

(56) References Cited

U.S. PATENT DOCUMENTS

| | | | |
|---|---|---|---|
| 9,838,376 | B1 | 12/2017 | Lander et al. |
| 9,967,745 | B2 | 5/2018 | Marquardt et al. |
| 10,521,780 | B1 | 12/2019 | Hopkins et al. |
| 10,601,703 | B2 | 3/2020 | Parasmal et al. |
| 2013/0139241 | A1 | 5/2013 | Leeder |
| 2014/0031012 | A1 | 1/2014 | Park et al. |
| 2016/0105540 | A1* | 4/2016 | Kwon ............... H04N 21/4312 715/747 |
| 2016/0227409 | A1 | 8/2016 | Schell et al. |
| 2017/0279774 | A1 | 9/2017 | Booz et al. |
| 2018/0019879 | A1 | 1/2018 | Kravitz et al. |
| 2018/0077151 | A1 | 3/2018 | Campero et al. |
| 2019/0121988 | A1* | 4/2019 | van de Ruit ......... H04L 9/0825 |
| 2019/0370358 | A1 | 12/2019 | Nation et al. |
| 2020/0076606 | A1* | 3/2020 | Burke ................. H04L 9/3234 |

FOREIGN PATENT DOCUMENTS

| | | | | |
|---|---|---|---|---|
| EP | 3477890 | A1 * | 5/2019 | ......... H04L 63/0853 |
| WO | 2017/074461 | A1 | 5/2017 | |
| WO | 2018/109598 | A1 | 6/2018 | |
| WO | WO-2018115929 | | 6/2018 | |
| WO | 2019/231578 | A1 | 12/2019 | |

OTHER PUBLICATIONS

Blockchain @ Telco How blockchain can impact the telecommunications industry and its relevance to the C-Suite, (Research Paper), Retrieved Jul. 21, 2018, 13 Pgs.

Langberg Ehud, "Blockchains in Mobile Networks", 2017, Retrieved on May 30, 2018, 16 Pgs. http://e.huawei.com/fr/publications/global/ict_insights/201703141505/core-competency/201703150928.

Mike Alexander, Driving Innovation in Telecommunications With Blockchain, Jan. 4, 2018, 5 Pgs.

Stanciu, A. et al, "Blockchain Based Distributed Control System for Edge Computing", 2017 21st International Conference on Control Systems and Computer Science, IEEE, May 29-31, 2017, 5 Pgs.

Xiong et al, "When Mobile Blockchain Meets Edge Computing", Apr. 2018, 16 Pgs. https://arxiv.org/pdf/1711.05938.pdf.

Zhu et al., "EdgeChain: Blockchain-based Multi-vendor Mobile Edge Application Placement", Jan. 12, 2018, https://arxiv.org/pdf/1801.04035.pdf.

Dean Bubley's Disruptive Wireless: Thought-leading wireless industry analysis, available online at <https://disruptivewireless.blogspot.com/2017/05/blockchain-and-telecoms-industry.html>, May 19, 2017, 4 Pages.

Fedak, G. et al., Blockchain-Based Decenlialized Cloud Computing, (Research Paper), Apr. 24, 2018, 40 Pages.

Extended European Search Report received for EP Patent Application No. 19202913.0, dated Mar. 9, 2020, 08 pages.

Extended European Search Report received for EP Patent Application No. 19204487.3, dated Feb. 25, 2020, 8 pages.

Leligou et al., "Smart Grid: A Demanding use case for 5G Technologies", PerSCC'18—Workshop on Pervasive Sensing for Sustainable Smart Cities and Smart Buildings, IEEE, 2018, pp. 215-220.

Oscar Novo, "Blockchain Meets IoT: An Architecture for Scalable Access Management in IoT", IEEE Internet of Things Journal, IEEE, vol. 5, No. 2, Apr. 1, 2018, pp. 1184-1195.

Xiong et al., "When Mobile Blockchain Meets Edge Computing", IEEE Communications Magazine, vol. 56, No. 8, Aug. 1, 2018, pp. 33-39.

Xu et al., "Edge Computing and Caching based Blockchain IoT Network", Proceedings of 2018 1st IEEE International Conference on Hot Information-Centric Networking (HOTICN 2018), IEEE, Aug. 15, 2018, pp. 238-239.

* cited by examiner

ACCESS TO TELECOM BLOCKCHAIN-BASED SERVICES WITH DIGITAL PASSPORT

BACKGROUND OF THE INVENTION

The rise of digital services on a cellular or telecommunications ("telecom") network implies identity proliferation and overlap, as well as proliferation of authentication mechanisms, thus affecting service usage uptake and the user experience. For example, having to authenticate over multiple services on a user device can present both technological security risk and user fatigue. This is because current digital ecosystems are not user centric, but rather service centric, not suitable for blockchain and other scenarios where different telecom operators provide cross services even though such services may be accessed by a single user device.

From a user perspective (both enterprises and individuals) the widespread uptake and usage of services in a cellular network is hampered by lack of an adequate simple, secure, privacy protected, digital ecosystem able to select and invoke the correct digital identity to access the right resources, at the right time, at the right place, with a user-controlled level of privacy to be exposed/shared for the right reasons.

DETAILED DESCRIPTION

Embodiments provide a Digital Passport Application ("DPA"), which may be stored at an embedded Subscriber Identity Module ("eSIM") of a user device, that is anchored to an Edge Digital Gate ("EDG") entitled to provide access to blockchain-based services, which may exist across different telecom operators. For example, the DPA may connect with the EDG in a client-server architecture using multi-factor authentication, including using eSIM-based authentication with an appropriate telecom network whose mobile network operator ("MNO") profile is active on the eSIM, local authentication at a user device, and EDG based authentication using access tokens that are digitally signed by the DPA. The DPA may store a digital persona that digitally represents an entity such as a user or machine so that the DPA may access and interact with blockchain-based services on behalf of the entity. For instance, the digital persona may bind a physical identity of the entity with a digital identity through a private key of the entity. The private key may be used to digitally sign the access token. The digital persona may further link the digital identity with one or more (typically multiple) virtual identities each associated with a blockchain-based service and each associated with a public key. Through use of the private and public keys, the DPA may request authenticated access to the services by supplying an appropriate virtual identity and an access token that authenticates the digital identity (and therefore the entity). In this manner, access to blockchain-based services accessed through a cellular network, may be user-centric in which users may access a wide array of blockchain-based services made available through the infrastructure of an MNO.

Figure 1:
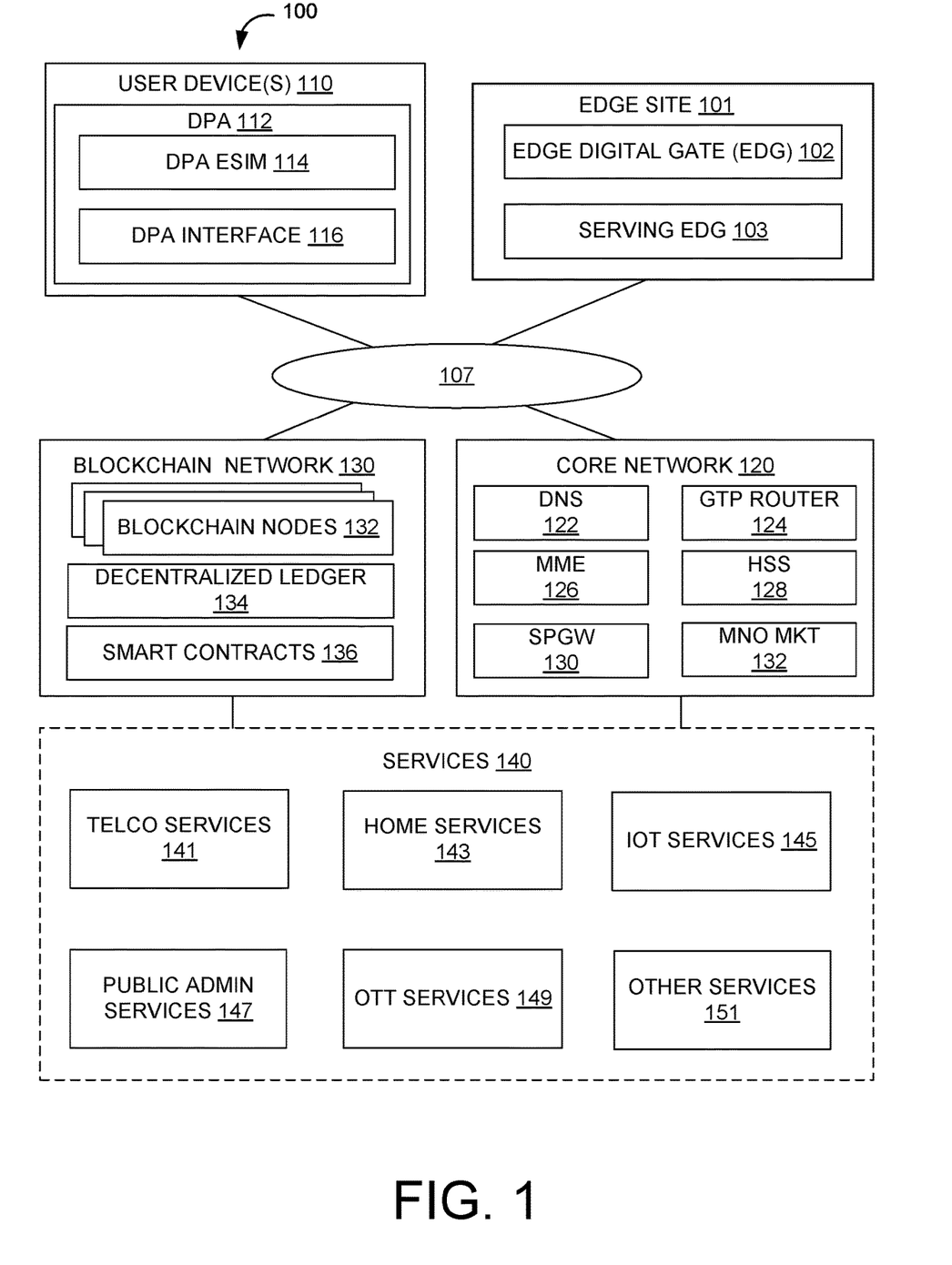
FIG. 1 illustrates a system of providing access to subscribed services, which may be blockchain-based, in a telecom network, according to an implementation of the disclosure.

FIG. 1 illustrates a system 100 of providing access to services 140, which may be blockchain-based, in a telecom network, according to an implementation of the disclosure. System 100 may include one or more user devices 110, an edge site 101 (or multiple edge sites 101), a core network 120, a blockchain network 130, and/or other components. The telecom network (not expressly illustrated) may include the core network 120, the edge site 101, one or more access points such as base stations to which the user devices 110 connect to access a Wide Area Network such as the Internet, and/or other telecom components. Each of the components of system 100 may be connected to one another by way of wireless and/or wired connections via a network 107.

The one or more user devices 110 may include devices that access the services 140 through the telecom network. For example, the user devices 110 may include an Internet of Things ("IoT") device, tablets, laptops, smartphones, smartwatches, and/or other devices that can access the services 140. Each device 110 may access multiple services 140. A given user may be associated with multiple user devices 110. The services 140 may be offered by third parties and/or the MNO of the telecom network. The services 140 may include but are not limited to one or more telco services 141, one or more home services 143, one or more IoT services 145, one or more public administrative services 147, one or more Over-the-Top ("OTT") services 149, and/or other services 151. It should be understood that although services 140 are illustrated together, services 140 are not necessarily hosted/provided by a single or co-located services providers.

As will be described in more detail, the user device 110 may execute a DPA 112 implementing a digital persona that represents an entity across the different services 140. The DPA 112 may include an eSIM component of the DPA 112 and an interface component of the eSIM. The eSIM component will be referred to as the DPA eSIM 114 and the interface component will be referred to as the DPA interface 116. As such, the DPA 112 may implement a user-centric, rather than service-centric, ecosystem for access control and service provision. For example, the digital passport application links virtual identifiers (such as login usernames) used to access each service 140 to a universal digital identifier. Each digital passport application executing on each user device 110 may implement a digital persona that represents an entity defined by the virtual identifiers linked to a digital identifier through a public key, and connected to a physical identifier through a private key. Entities may digitally sign data such as transactions to be written to the decentralized ledger 134 or various tokens described herein using the private key. Using the DPA 112, an entity may access different services 140 through a single digital persona.

In some implementations, the services 140 may be blockchain-based in that they may be transacted using the blockchain network 130. For example, one or more smart contracts 136 of the blockchain network 130 may be used to define terms of accessing the services 140. In this example, access to and use of the services 140 may be automatically executed by the smart contracts 136. In some instances, activity of users using the services 140 may be recorded on one or more decentralized ledgers 134 of the blockchain network 130. In these and/or other ways, the services 140 may be blockchain-based. Services 140 that are blockchain-based will also be referred to as "blockchain-based services." The blockchain network 130 includes a plurality of blockchain nodes 132 that communicate with one another. Such communication may be via a peer-to-peer communication protocol. Each of the blockchain nodes 132 store a full or partial copy of the decentralized ledger 134. The decentralized ledger 134 may be composed of ledger blocks that each refer back to a hash of a prior ledger block. Each blockchain node 132 may be programmed with a blockchain agent that includes logic for interacting with other blockchain nodes, writing transactions, writing ledger entries, participating in consensus decisions, and/or performing other blockchain related functions.

In some instances, the smart contracts 136 may define terms agreed to by various parties, such as an entity that accesses one or more of the services 140 and providers of the services. In some instances, each smart contract 136 may include logic or rules for automatically executing the terms of the contract, including access control, service level agreement terms, subscriptions, and/or other aspects of service provision. One or more components of the telecom network may be a blockchain node 132 of the blockchain network 130. In other words, a component of the telecom network may be programmed with the blockchain agent. For example, the EDG 102 may act as a blockchain node 132.

The cellular network may include one or more edge sites 101. Each edge site 101 may include one or EDGs 102 and one or more serving EDGs 103. A service EDG 103 may include an EDG that provides a listing of blockchain-based services to requesting user devices and may route access to the services through an EDG 102.

From a user perspective, the disclosure provides a secure and trusted user-centric access to the digital services incubated by a telecom blockchain, as well as a simplified user experience in discovering, enrolling and using blockchain-based digital services. The disclosure further provides an agnostic user experience from a wide range of devices (such as IoT devices, tablets, laptops, smartphones, smartwatches, etc.) and their location. The user-centric approach of the disclosure uses a universal identifier, allowing identity processes to operate on a global, de-parameterized scale, binding between physical identifiers, digital identifiers, and virtual identifiers that permit a user to select and invoke the correct digital identity to access corresponding resources.

The core network 120 may include a Domain Name System ("DNS") 122, a GPRS Tunneling Protocol ("GTP") router 124, a Mobility Management Entity ("MME") 126, a Home Subscriber Server ("HSS") 128, an Packet Data Network Gateway ("SPGW") 130, an MNO marketplace ("Mkt") 132, and/or other components. DNS 122 may manage Internet Protocol addresses for various system components. GTP router 124 may route requests from the user device 110 to an appropriate EDG 101. MME 126 may include key control for authenticating a user device 110 at HSS 128. HSS 128 may authenticate a requesting user device 110 to join the cellular network. Other types of authentication servers may be used as well, depending on the type of cellular network used. SPGW 130 may manage communications between 3GPP technologies and non-3GPP technologies.

MNO marketplace ("Mkt") 132 may include a listing of all available services 140 accessible through a cellular network of the MNO. Different MNOs may have different MNO marketplaces 132. At least some of the available services may include blockchain-based services.

Figure 2:
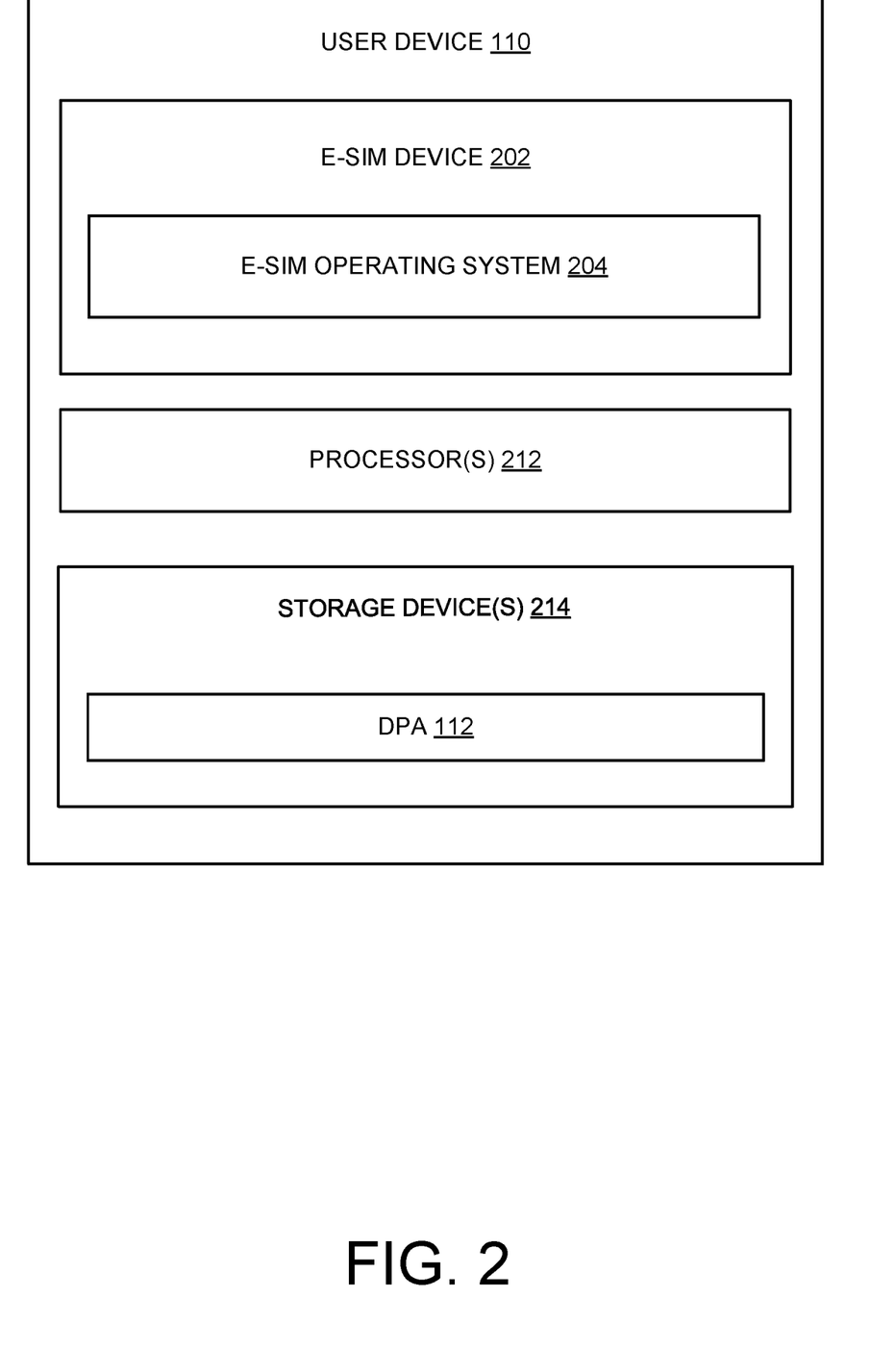
FIG. 2 illustrates an example of a user device that implements a digital persona, according to an implementation of the disclosure.

FIG. 2 illustrates an example of a user device 110 that implements a digital persona, according to an implementation of the disclosure. The user device 110 may include an eSIM device 202, one or more processors 212, one or more storage devices 214, and/or other components. The eSIM device 202 may include an eSIM operating system 204, described in more detail below with respect to FIG. 3. The one or more storage devices 214 may store the DPA interface 116, which executes on the one or more processors 212.

The DPA 112 may represent an entity and may access or subscribe to services 140 on behalf of the entity. Digital services delivered over the telecom network may be consumed as value added session interactions agreed and paid through on-demand smart contracts 136 validated through a chain of EDGs 102.

The DPA 112 may therefore be used to access services 140, including the blockchain network 130. To do so, the DPA 112 may establish a client-server relationship with an EDG 102, which may disintermediate the user from the EDG chain. The DPA 112 may maintain the bind between a physical ID and a digital ID that represents an entity. The DPA 112 may participate in rules execution and transaction validation at an EDG 102 on behalf of the entity. In some instances, the DPA 112 may manage privacy and other settings on behalf of the entity. In some instances, the DPA 112 may act as a Blockchain Edge Enforcement Point (BEEP) at the user device 110.

The DPA interface 116 may provide an interface to the DPA 112. For example, the DPA interface 116 may include an icon or used to open a graphical user interface of the DPA 112 for implementations in which the DPA 112 is operated by a user. Although examples will describe user-interactions, the DPA 112 may be operated by a machine as well. For example, the DPA interface 116 may include inter-process communication calls for implementations in which the DPA 112 by a machine such as another or application.

In some instances, the DPA interface 116 may program the physical processor to receive, from the EDG, a listing of the one or more blockchain-based services. The DPA interface 116 may program the physical processor to receive, from the entity, a selection of at least a first blockchain-based service from among the one or more blockchain-based services. The DPA interface 116 may program the physical processor to transmit a request to enroll in the first blockchain-based service, where the request includes a first virtual identifier that is linked to the entity and corresponds to the first blockchain-based service.

The DPA interface 116 may further program the physical processor to receive an access token from the edge digital gate. The access token may indicate an authorization to access the first blockchain-based service. The DPA interface 116 may further program the physical processor to digitally sign the access token and store the digitally signed access token via the eSIM component for accessing the first blockchain-based service.

Figure 3:
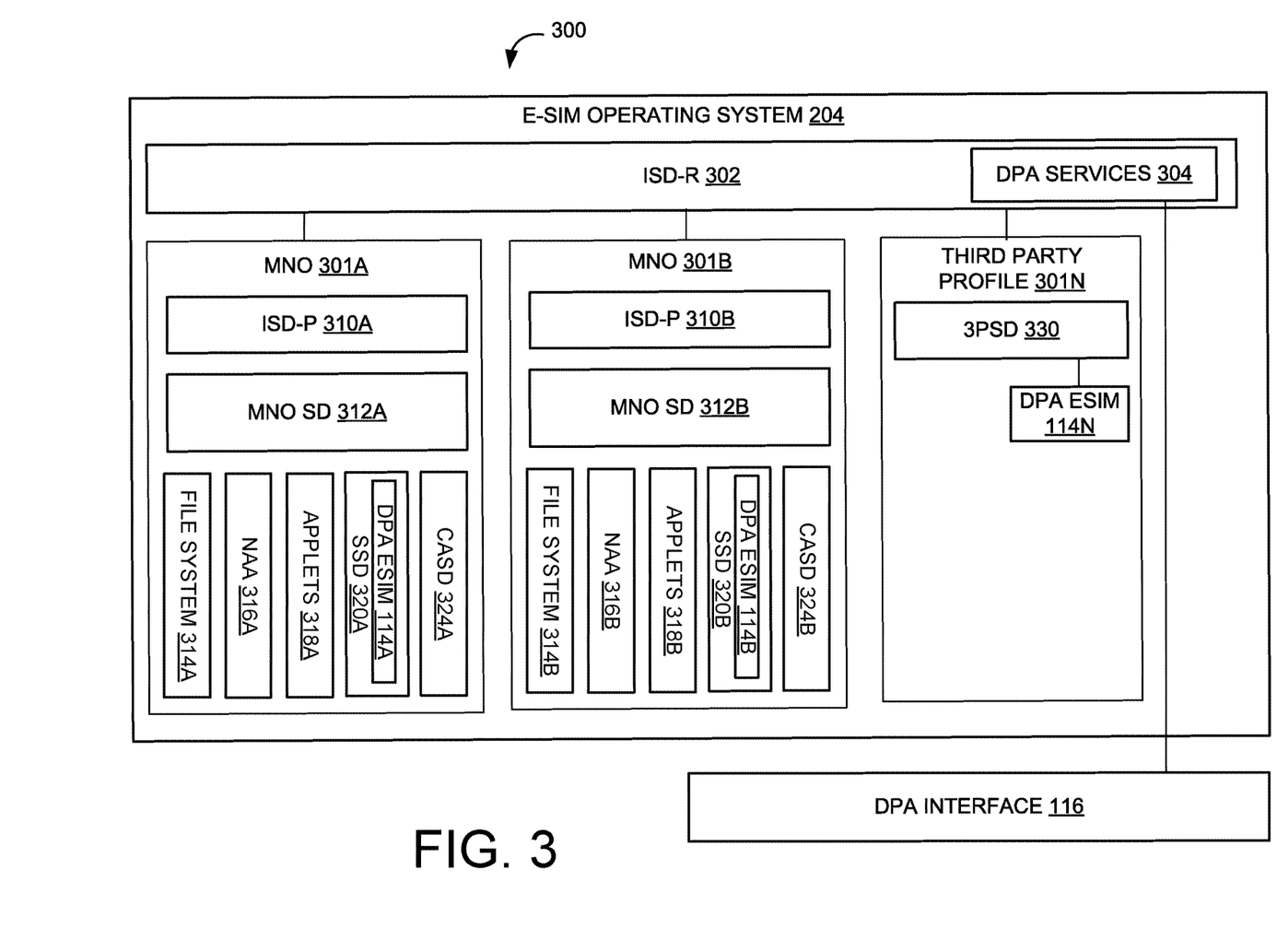
FIG. 3 illustrates an embedded SIM device operating system for implementing a digital passport application that implements digital personas, according to an implementation of the disclosure.

FIG. 3 illustrates an embedded SIM device operating system 204 for implementing a digital passport application that implements digital personas, according to an implementation of the disclosure. The eSIM device operating system ("OS") 204 may store one or more MNO profiles 301 (conceptually illustrated as MNO profiles 301A and 301B). Each MNO profile 301 may correspond to a respective MNO that operates a telecom network. The Issuer Security Domain-Root (ISD-R 302) generates of new Issuer Security Domain-Profile (ISD-Ps) 310, e.g., ISD-P 310A and/or ISD-P 310B.

Each ISD-P 310 is a secure container (Security Domain) for the hosting a corresponding MNO Profile. Only one of the MNO profiles 301 will be active, as indicated by the DPA services 304. The DPA services 304 may provide a list of installed MNO profiles 301 and their current status. For example, the DPA services 304 may provide the DPA interface 116 with an indication of the active MNO profile 301. This permits the user to be redirected to the correct blockchain network 130 (of the MNO associated with the active MNO profile 301).

Each MNO profile 301 may be associated with respective ones of the following components:

File system 314 may include a local file system for a given MNO profile 301. The file system 314 may store profile metadata, including profile policy rules, and/or other data for the MNO. Network Access Application ("NAA") 316 may include a set of network applications that can be implemented by an MNO associated with the corresponding MNO profile 301. Each NAA 316 may access or be accessed from the cellular network. Applets 318 may include various applets that may execute locally at the eSIM device 202.

MNO Profiles are stored inside MNO—Security Domains ("SD") 312 within the eSIM and are implemented using Global Platform standards. These ensure that it is impossible for any MNO Profile 301 to access the applications or data of any other MNO Profile stored on the eSIM. The MNO-SD is the on-card representative of the Operator. It contains the Operator's Over-The-Air (OTA) Keys and provides a secure OTA channel.

The Supplementary Security Domain ("SSD") 320 may include supplementary storage and security capabilities and may store the DPA eSIM 114. The Controlling Authority Security Domain ("CASD") 324 is responsible for secure storage of credentials required to support the required security domains on the eSIM device 202.

In some implementations, the DPA eSIM 114 may be stored with respective MNO profiles 301, in which case it may not be accessed unless the particular MNO profile at which it is stored is active. In other implementations, the DPA eSIM 114 (illustrated as DPA eSIM 114N) may be stored with a Third Party Security Domain ("3PSD") 330. In these implementations, the DPA eSIM 114N may be accessible regardless of which MNO profile 301 is active.

Figure 4:
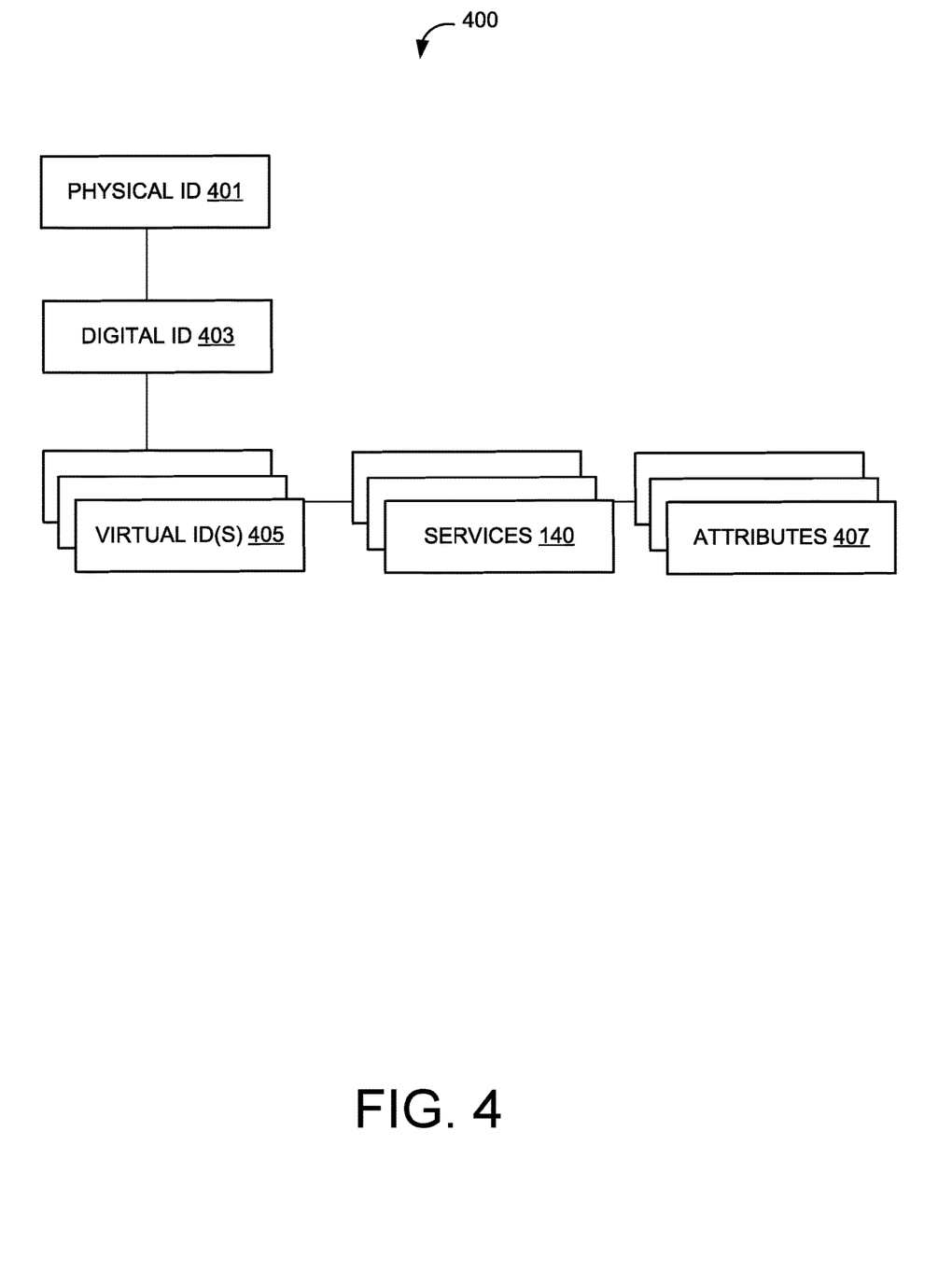
FIG. 4 illustrates an example of identities of a digital persona, according to an implementation of the disclosure.

FIG. 4 illustrates an example of identities of a digital persona 400, according to an implementation of the disclosure. A physical identity 401 may be mapped to a digital identity 403 used by the DPA 112. The digital identity be linked to the physical identity 401 via a private key. The digital identity 403 may be linked to multiple virtual identities 405. Each of these virtual identities 405 may be assigned by and used at corresponding services 140. For instance, a virtual identity 405 may include a logon name for a service 140. As such, the digital persona may represent a range of virtual identities used by an entity to access various services 140. Each of the services 140 may be associated with various attributes 407. As noted previously, services 140 may include but are not limited to one or more telco services 141, one or more home services 143, one or more IoT services 145, one or more public administrative services 147, one or more Over-the-Top ("OTT") services 149, and/or other services 151. The attributes 407 may include various metadata that the service 140 generates about the entity, including one or more characteristics of the entity, identifying information (e.g., virtual identifiers, digital identifiers, and/or binding thereof), services-relevant information associated with the entity, and other metadata regarding or relevant to the entity. They may be stored as part of the digital persona 400 for a given entity.

Figure 5:
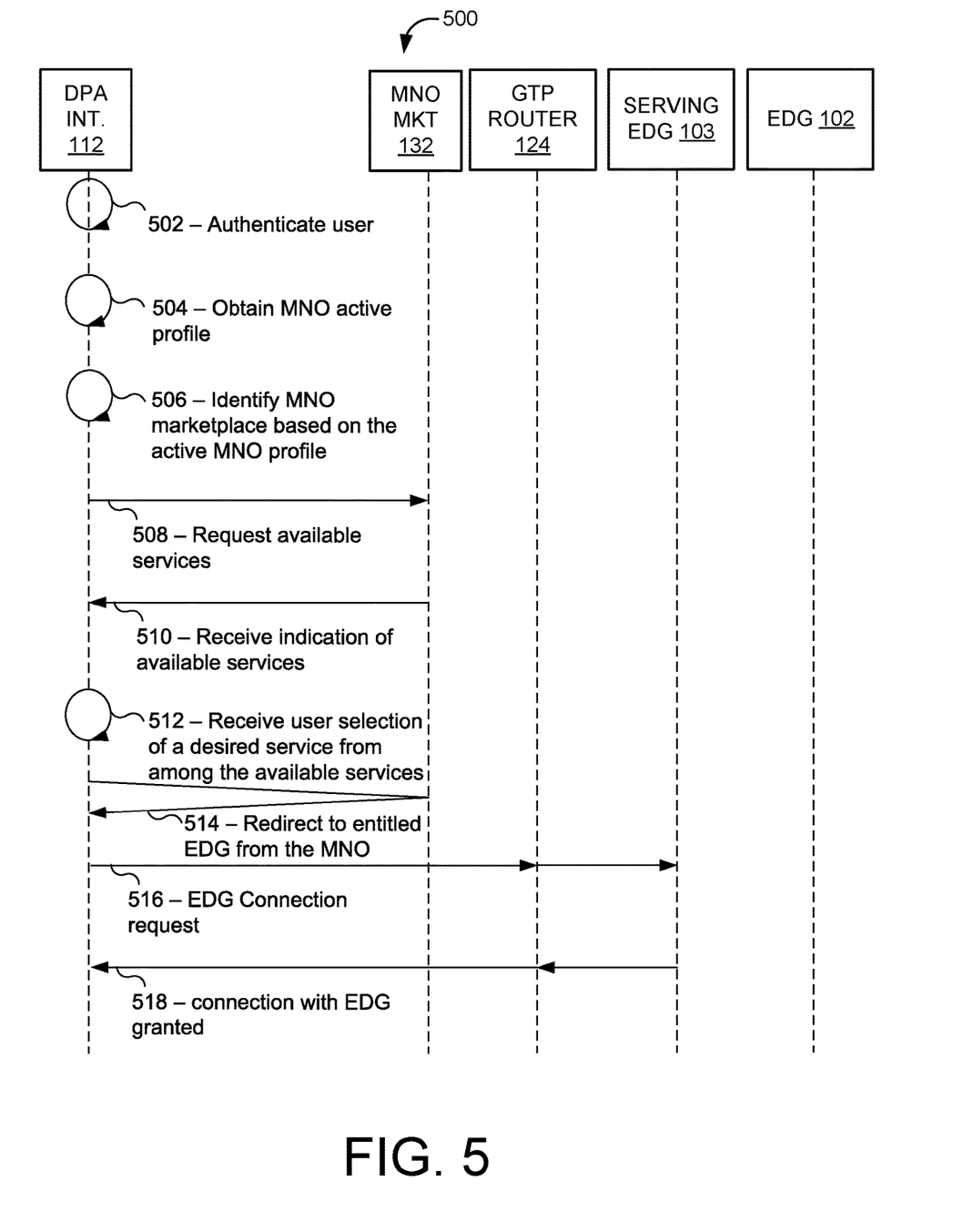
FIG. 5 illustrates a process of accessing blockchain-based services in a telecom network, according to an implementation of the disclosure.

FIG. 5 illustrates a process 500 of accessing blockchain-based services in a telecom network, according to an implementation of the disclosure.

In an operation 502, process 500 may include authenticating a user. For example, the user may have opened the DPA 112 by selecting an icon on a user device 110 corresponding to the DPA interface 116. The authentication may include biometric authentication using onboard biometric sensors, passcode entry, and/or other authentication that can be made locally at the user device 110.

In an operation 504, process 500 may include identifying an active MNO profile 301. The active MNO profile 301 may be obtained from the DPA services 304. In an operation 506, process 500 may include being redirected to MNO marketplace 124 for the MNO associated with the active MNO profile.

In an operation 508, process 500 may include requesting available services from the MNO marketplace 132. In an operation 510, process 500 may include receiving an indication of the available services from the MNO marketplace 132. The available services may include a type of services that are blockchain-based. In an operation 512, process 500 may include receiving a user selection of the blockchain-based service type.

In an operation 514, process 500 may include obtaining a redirection from the MNO of an EDG entitled to service the blockchain-based services. Such redirection may be made through the GTP router 124. In an operation 516, process 500 may include making a connection request to a serving EDG 103. In an operation 518, process 500 may include receiving a connection grant from the service EDG 103.

Figure 6:
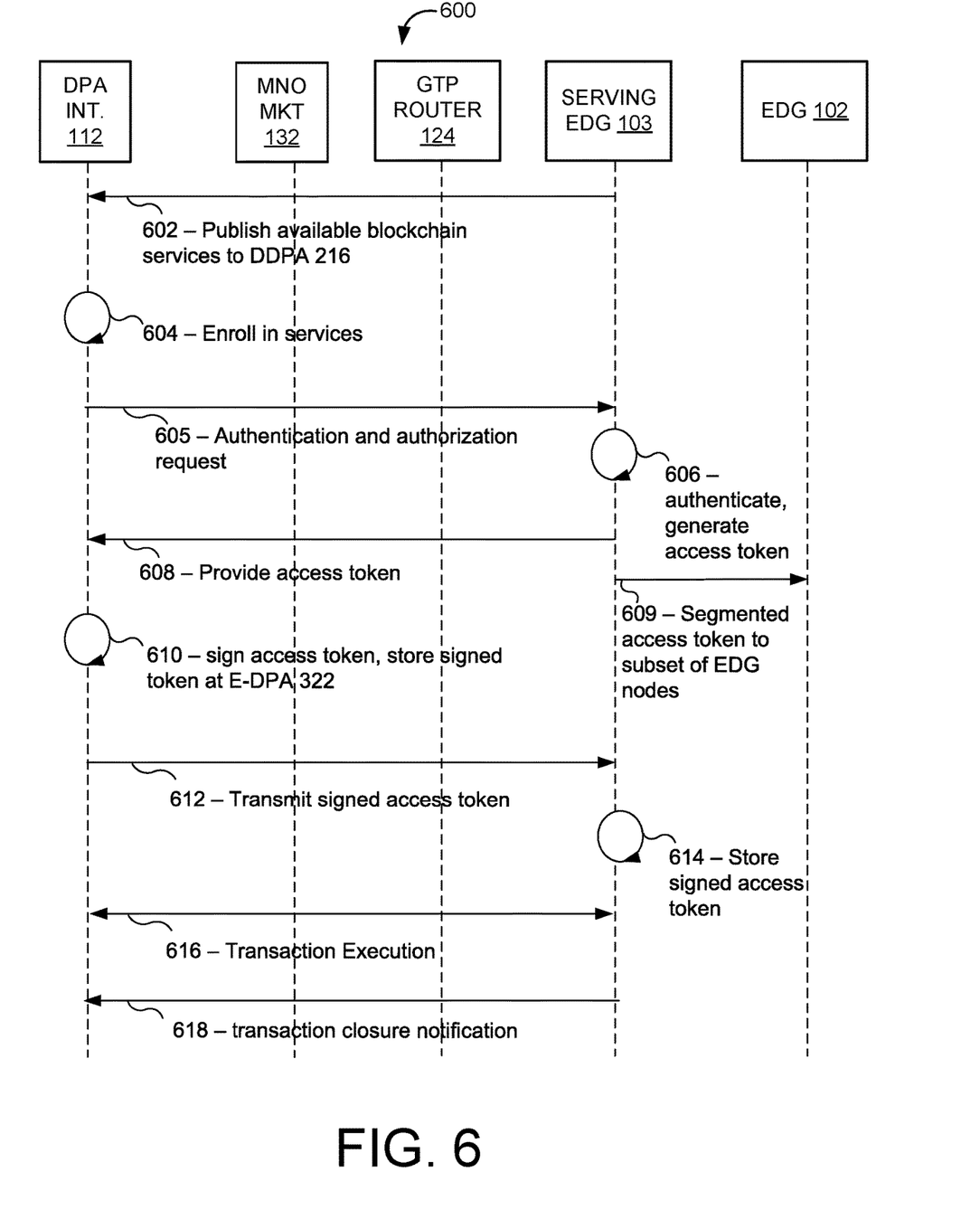
FIG. 6 illustrates a process of enrolling in blockchain-based services in a telecom network, according to an implementation of the disclosure.

FIG. 6 illustrates a process 600 of enrolling in blockchain-based services in a telecom network, according to an implementation of the disclosure.

In an operation 602, process 600 may include publishing available blockchain-based services to the DPA interface 116. For example, the serving EDG 103 may publish available services 140, which may be blockchain-based.

In an operation 604, process 600 may include enrolling in one or more services 140. For example, DPA interface 116 may receive a user selection of a desired service 140.

In an operation 605, process 600 may include transmitting an Authentication & Authorization request the serving EDG 103.

In an operation 606, process 600 may include authenticating the user and generating an access token at the serving EDG 103 responsive to the request for enrolling in a service and authentication of the user. The access token may be generated based on an entitlement network function executed by the EDG 103.

In an operation 608, process 600 may include providing the access token to the DPA interface 116.

In an operation 609, process 600 may include transmitting a segmented access token to other EDG nodes 102 of a sub-blockchain for multi-nodes storage (each EDG 102 of the sub-blockchain may store its corresponding segment of the access token). Operations 608 and 609 may occur simultaneously such as via multicast or substantially simultaneously such as through data serialization at the same time.

In an operation 610, process 600 may include digitally signing the access token with the private key maintained by the DPA 112. The DPA interface 116 may then store the signed access token at the DPA eSIM 114.

In an operation 612, process 600 may include transmitting the signed access token to the serving EDG 103. In an operation 614, process 600 may include storing the signed access token at the serving EDG 103.

In an operation 616, process 600 may include executing a transaction, such as a service enrollment transaction, relating to the enrolled service 140. In an operation 618, process 600 may include transmitting a transaction closure notification to the DPA interface 116. For example, the transaction closure notification may indicate successful enrollment and access token generation.

Figure 7:
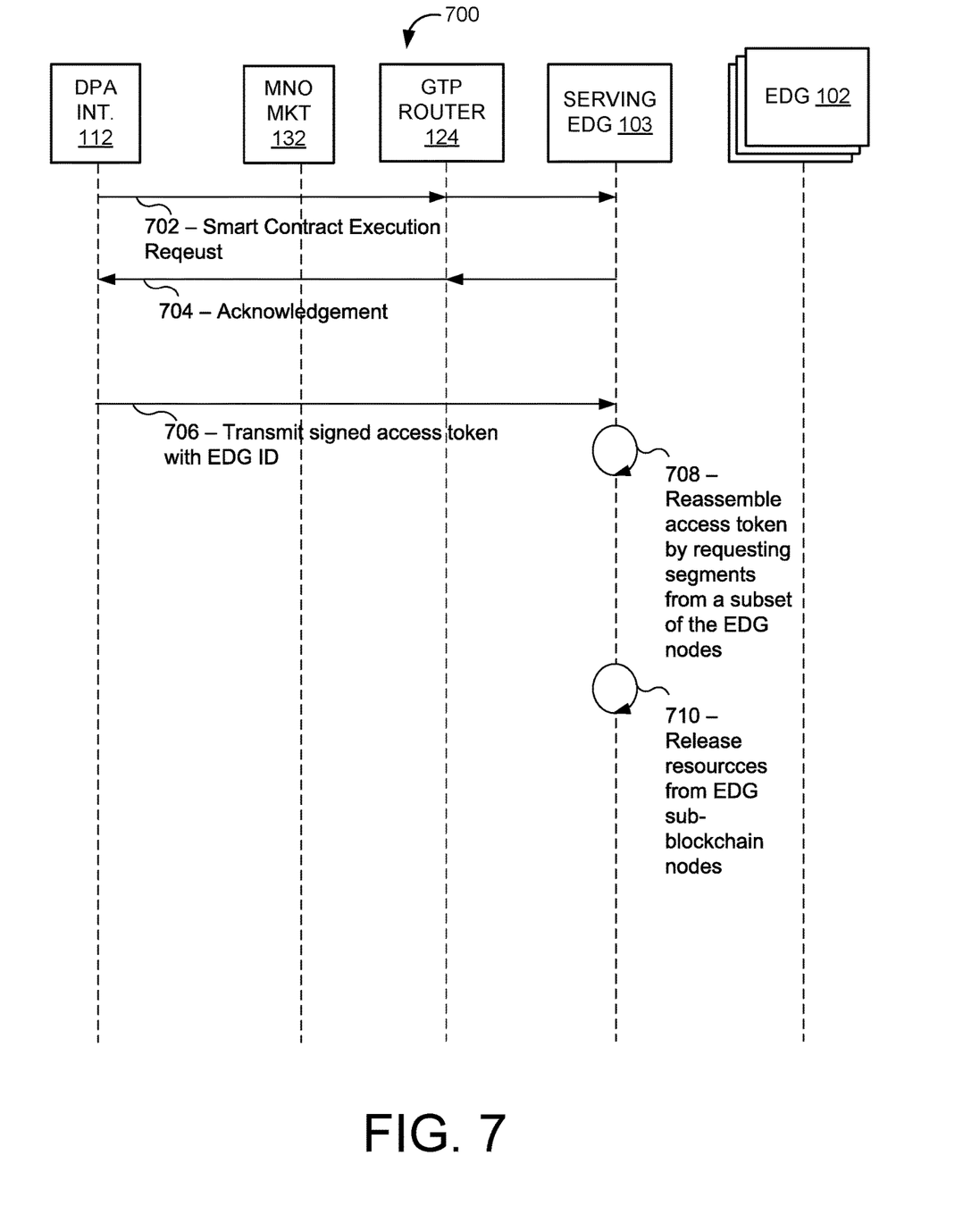
FIG. 7 illustrates a process of authenticating blockchain-based service usage in a telecom network, according to an implementation of the disclosure.

FIG. 7 illustrates a process 700 of authenticating blockchain-based service usage in a telecom network, according to an implementation of the disclosure.

In an operation 702, process 700 may include transmitting a smart contract execution request. For example, the DPA interface 116 may transmit the request (based on input from a user). The MNO may redirect the DPA interface 116 to the entitled EDG trough GTP the Router 124 as per the 3GPP standard. If the session is still open, the serving EDG 103 will be same EDG node as the one that performed the service enrollment transaction. Otherwise, a new EDG 102 will be selected as the serving EDG 103.

In an operation 704, process 700 may include receiving an acknowledgement of the request. In an operation 706, process 700 may include transmitting a signed access token. The signed access token may include an identification of the serving EDG 103 that generated the access token.

In an operation 708, process 700 may include reassembling the access token by obtaining segments of the token from respective EDGs 102 that each have a respective segment of the access token. In some instances, if the serving EDG 103 that generated the access token may perform operation 708. If the current serving EDG 103 is not the same EDG that generated the access token, for example, the current serving EDG 103 may route processing to the EDG that generated the access token. The EDG that generated the access token will reassemble the access token from the obtained segments and forward the reassembled token to the current serving EDG 103. In an operation 710, process 700 may include releasing resources from EDG 102 sub-blockchain nodes.

Figure 8:
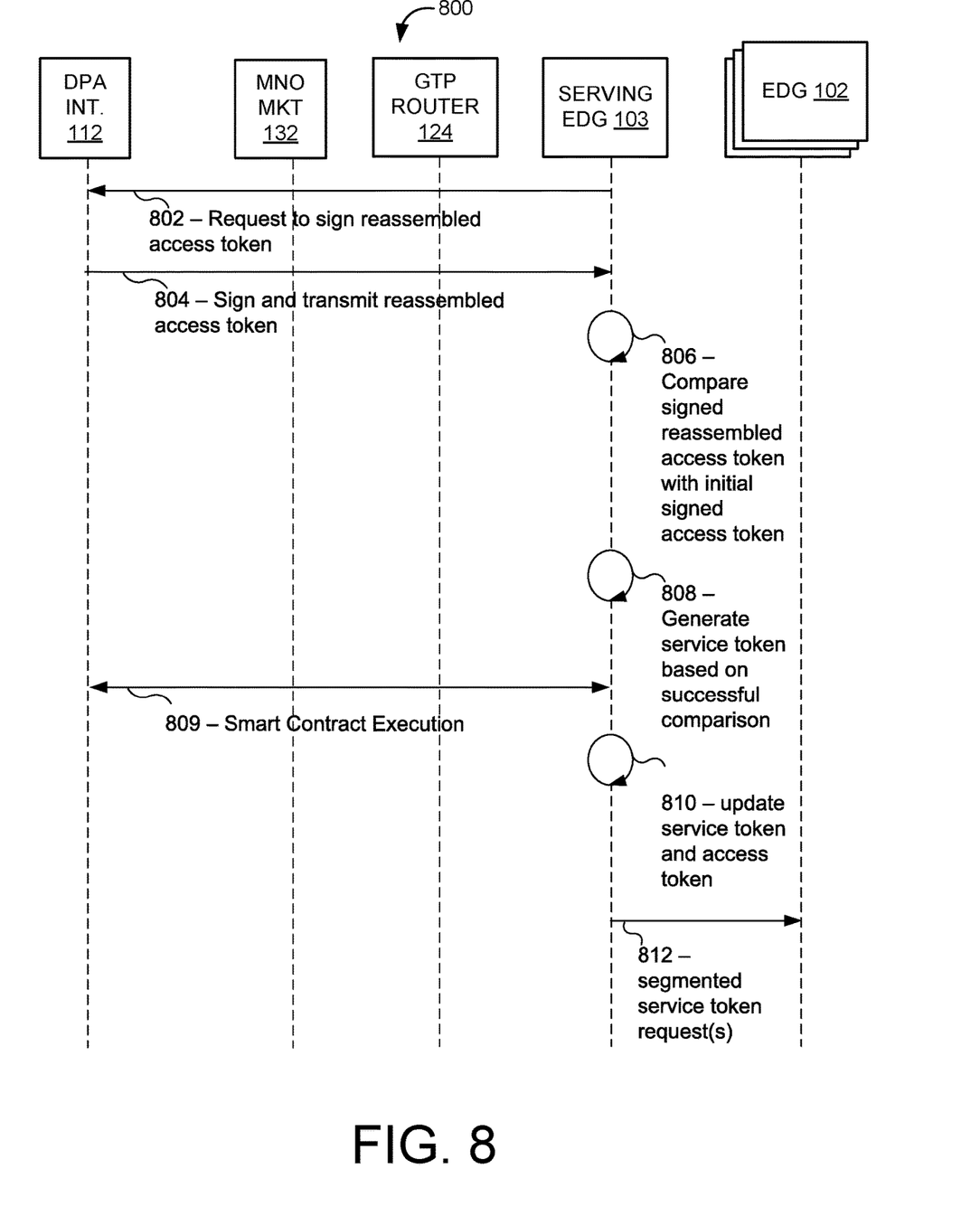
FIG. 8 illustrates a process of managing blockchain-based service usage in a telecom network, according to an implementation of the disclosure.

FIG. 8 illustrates a process 800 of managing blockchain-based service usage in a telecom network, according to an implementation of the disclosure.

In an operation 802, process 800 may include receiving a request to sign a reassembled access token. For example, the serving EDG 103 may transmit a reassembled access token (such as the result of operation 708 in FIG. 7) to the DPA interface 116 for digitally signature.

In an operation 804, process 800 may include digitally signing the reassembled access token (such as using the private key maintained by the DPA 112), and transmitting the signed reassembled access token to the serving EDG 103.

In an operation 806, process 800 may include comparing the signed reassembled access token with the initial signed access token (such as the signed access token from operations 610 and 612 from FIG. 6). If the two match, then access is authenticated based on the signed reassembled access token. In this manner, access tokens may be securely stored in segments across relevant EDGs 102 for authentication.

In an operation 808, process 800 may include generating a service token based on a successful (matching) comparison.

In an operation 809, process 800 may include executing a smart contract associated with a requested service 140. For instance, the serving EDG 103 may obtain smart contract 136 for execution.

In an operation 810, process 800 may include updating the access token and the service token to indicate authentication and access grant. For example, the access token may be updated with a service token ID that identifies the service token and an identification of the current serving EDG 103. The service token may be updated with an identification of the access token.

In an operation 812, process 800 may include again segmenting the access token and dispersing it to other EDG 102 nodes for each to store respective segments of the access token as before. These EDG 102 nodes may be (but are not necessarily) different than the prior ones used to store the initial segmented access token. Likewise, the service token may be partitioned and distributed to different EDGs 102.

Figure 9:
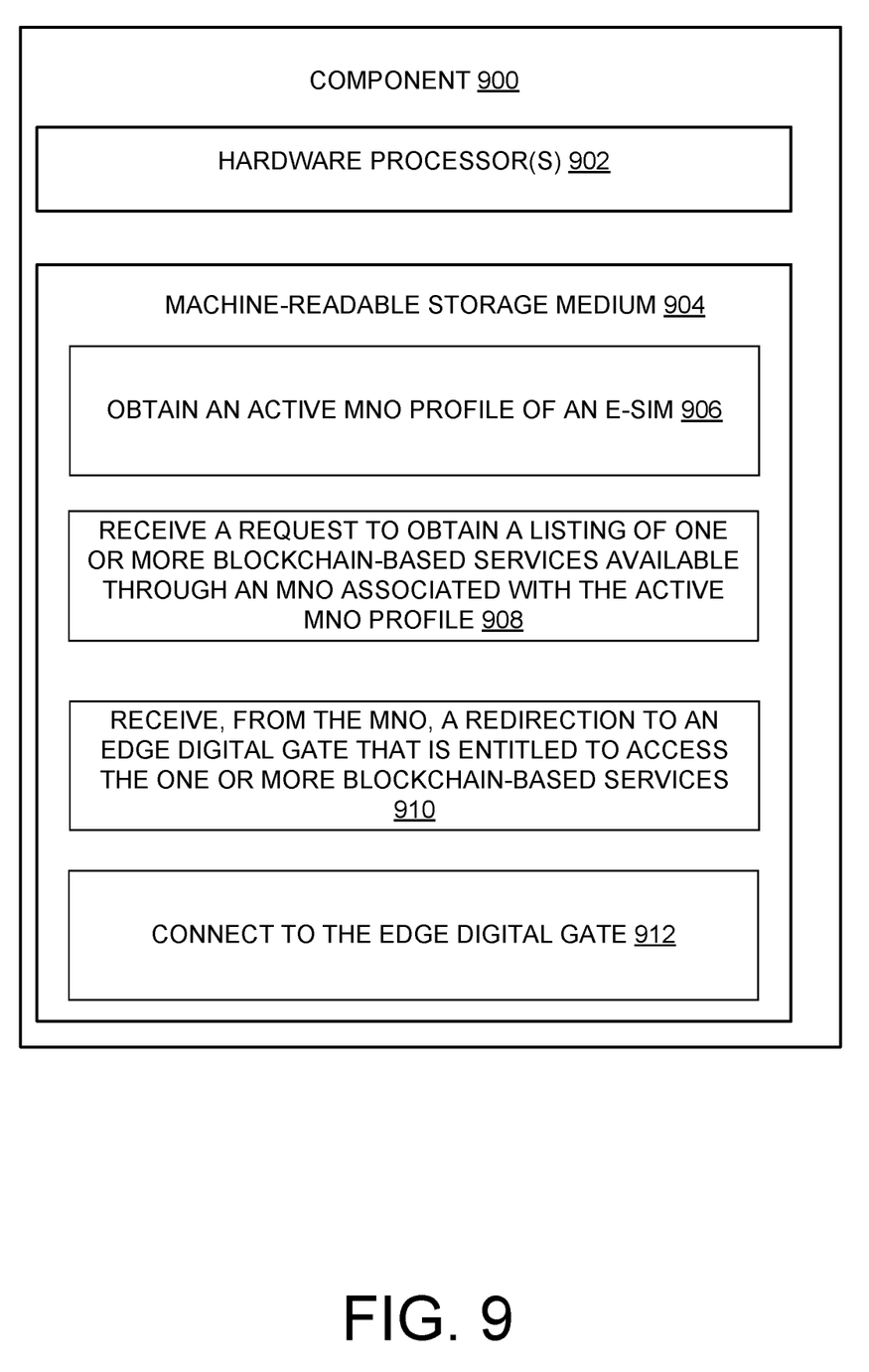
FIG. 9 is a block diagram of an example computing component or device for accessing blockchain-based services in a telecom network in accordance with one embodiment.

FIG. 9 is a block diagram of an example computing component or device 900 for accessing blockchain-based services in a telecom network in accordance with one embodiment.

Computing component 900 may be, for example, a server computer, a controller, or any other similar computing component capable of processing data. In the example implementation of FIG. 9, the computing component 900 includes a hardware processor 902, and machine-readable storage medium 904. In some embodiments, computing component 900 may be an embodiment of a user device 110, for example.

Hardware processor 902 may be one or more central processing units (CPUs), semiconductor-based microprocessors, and/or other hardware devices suitable for retrieval and execution of instructions stored in machine-readable storage medium, 904. Hardware processor 902 may fetch, decode, and execute instructions, such as instructions 906-512, to control processes or operations for operating an EDG. As an alternative or in addition to retrieving and executing instructions, hardware processor 902 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 904, may be any electronic, magnetic, optical, or other physical storage device that contains or stores executable instructions. Thus, machine-readable storage medium 904 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 904 may be a non-transitory storage medium, where the term "non-transitory" does not encompass transitory propagating signals. As described in detail below, machine-readable storage medium 904 may be encoded with executable instructions, for example, instructions 906-912, for client device grouping.

Hardware processor 902 may execute instruction 906 to obtain an active MNO profile from an eSIM device. Hardware processor 902 may execute instruction 908 to receive, from an entity, a request to obtain a listing of one or more blockchain-based services available through an MNO associated with the active MNO profile. Hardware processor 902 may execute instruction 910 to receive, from the MNO, a redirection to an EDG that is entitled to provide access to the one or more blockchain-based services. Hardware processor 902 may execute instruction 912 to connect to the EDG based on the redirection.

The described operations, such as those illustrated in FIGS. 5-9 and described above, may be accomplished using some or all of the system components described in detail herein and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting. It is to be expressly understood that the drawings are for the purpose of illustration and description only and are not intended as a definition of the limits of the invention.

Figure 10:
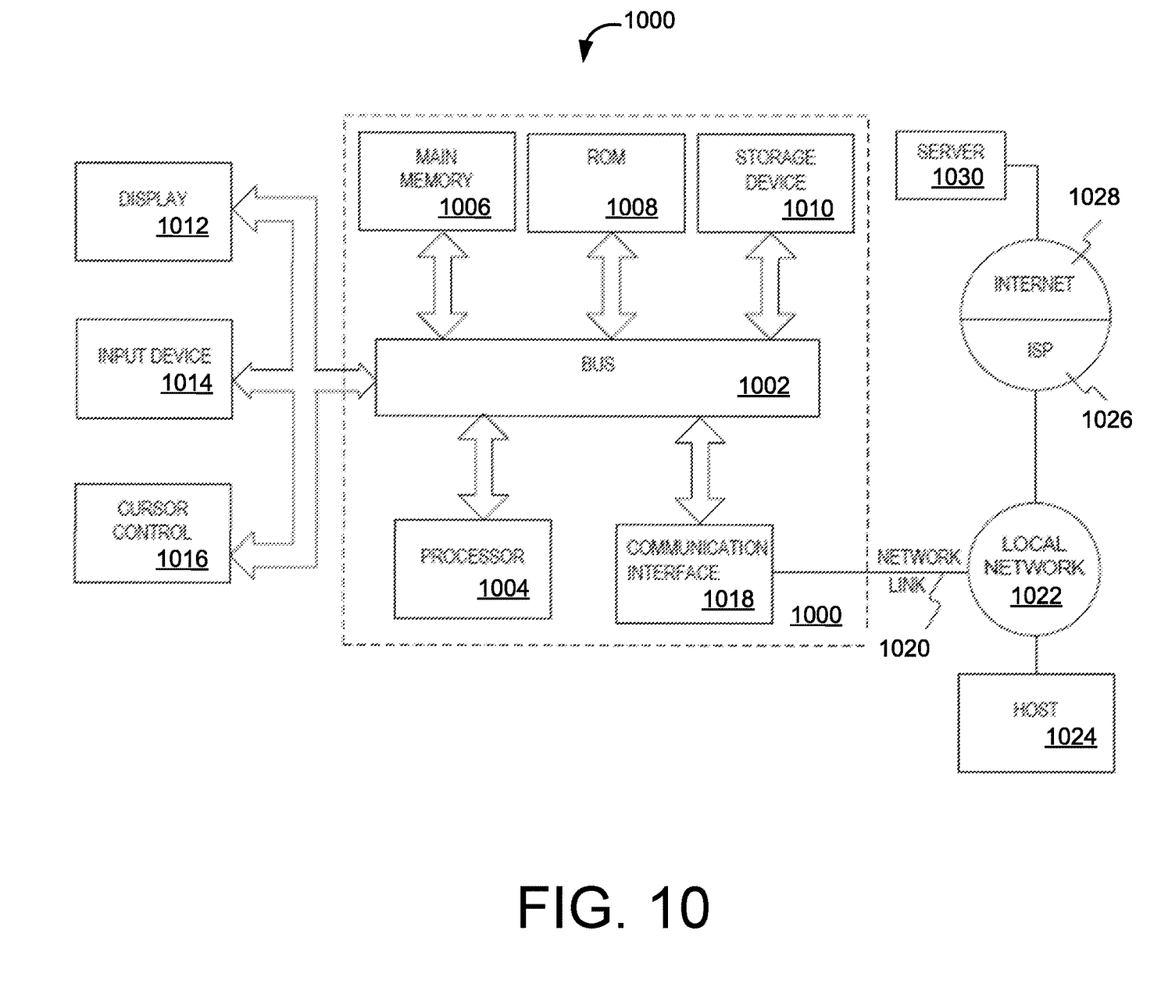
FIG. 10 depicts a block diagram of an example computer system in which any of the embodiments described herein may be implemented.

FIG. 10 depicts a block diagram of an example computer system in which any of the embodiments described herein may be implemented. The various components illustrated in FIGS. 1-4 may be implemented according to the computer system 1000. The computer system 1000 includes a bus 1002 or other communication mechanism for communicating information, one or more hardware processors 1004 coupled with bus 1002 for processing information. Hardware processor(s) 1004 may be, for example, one or more general purpose microprocessors.

The computer system 1000 also includes a main memory 1006, such as a random access memory (RAM), cache and/or other dynamic storage devices, coupled to bus 1002 for storing information and instructions to be executed by processor 1004. Main memory 1006 also may be used for storing temporary variables or other intermediate information during execution of instructions to be executed by processor 1004. Such instructions, when stored in storage media accessible to processor 1004, render computer system 1000 into a special-purpose machine that is customized to perform the operations specified in the instructions.

The computer system 1000 further includes a read only memory (ROM) 1008 or other static storage device coupled to bus 1002 for storing static information and instructions for processor 1004. A storage device 1010, such as a magnetic disk, optical disk, or USB thumb drive (Flash drive), etc., is provided and coupled to bus 1002 for storing information and instructions.

The computer system 1000 may be coupled via bus 1002 to a display 1012, such as a cathode ray tube (CRT) or LCD display (or touch screen), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 1000 may include a user interface component to implement a GUI that may be stored in a mass storage device as executable software codes that are executed by the computing device(s). This and other components may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

The computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor(s) 1004 executing one or more sequences of one or more instructions contained in main memory 1006. Such instructions may be read into main memory 1006 from another storage medium, such as storage device 1010. Execution of the sequences of instructions contained in main memory 1006 causes processor(s) 1004 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1010. Volatile media includes dynamic memory, such as main memory 1006. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may retrieves and executes the instructions. The instructions received by main memory 1006 may optionally be stored on storage device 1010 either before or after execution by processor 1004.

The computer system 1000 also includes a communication interface 1018 coupled to bus 1002. Communication interface 1018 provides a two-way data communication coupling to one or more network links that are connected to one or more local networks. For example, communication interface 1018 may be an integrated services digital network (ISDN) card, cable modem, satellite modem, or a modem to provide a data communication connection to a corresponding type of telephone line. As another example, network interface 1018 may be a local area network (LAN) card to provide a data communication connection to a compatible LAN (or WAN component to communicated with a WAN). Wireless links may also be implemented. In any such implementation, network interface 1018 sends and receives electrical, electromagnetic or optical signals that carry digital data streams representing various types of information.

A network link 1020 typically provides data communication through one or more networks to other data devices. For example, a network link may provide a connection through local network to a host computer 1024 or to data equipment operated by an Internet Service Provider (ISP) 1026. The ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link and through communication interface 1018, which carry the digital data to and from computer system 1000, are example forms of transmission media.

The computer system 1000 can send messages and receive data, including program code, through the network(s), network link and communication interface 1018. In the Internet example, a server 1030 might transmit a requested code for an application program through the Internet 1028, the ISP 1026, the local network 1022 and the communication interface 1018.

The received code may be executed by processor 1004 as it is received, and/or stored in storage device 1010, or other non-volatile storage for later execution.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A user device, comprising:
an embedded Subscriber Identity Module (eSIM) that stores one or more Mobile Network Operator (MNO) profiles, at least one of which is an active MNO profile, and stores and executes an eSIM component of a digital passport application that acts on behalf of an entity;
a memory device that stores an interface component of the digital passport application;
a physical processor programmed with the interface component to:
obtain the active MNO profile from the eSIM;
receive, from the entity, a request to obtain a listing of one or more blockchain-based services available through an MNO associated with the active MNO profile;
receive, from the MNO, a redirection to an edge digital gate that is entitled to provide access to the one or more blockchain-based services; and
connect to the edge digital gate based on the redirection.

2. The user device of claim 1, wherein the physical processor is further programmed with the interface component to:
receive, from the edge digital gate, the listing of the one or more blockchain-based services;
receive, from the entity, a selection of at least a first blockchain-based service from among the one or more blockchain-based services;
transmit a request to enroll in the first blockchain-based service, the request including a first virtual identifier linked to the entity and corresponding to the first blockchain-based service;
receive an access token from the edge digital gate, the access token being indicative of an authorization to access the first blockchain-based service; and
digitally sign the access token and store the digitally signed access token via the eSIM component for accessing the first blockchain-based service.

3. The user device of claim 2, wherein the digital passport application uses a digital persona comprising a physical identifier of the entity, a digital identifier bound to the physical identifier, and one or more virtual identifiers, including the first virtual identifier, each linked with the digital identifier and each associated with a corresponding blockchain-based service.

4. The user device of claim 3, wherein the digital passport application binds the physical identifier to the digital identifier via a private key of the entity and links the digital identifier with each of the one or more virtual identifiers via a public key of the entity.

5. The user device of claim 2, wherein the interface component further programs the processor to:
transmit the digitally signed access token to the edge digital gate for accessing the first blockchain-based service; and
receive an indication that a transaction associated with accessing the first blockchain-based service has been closed.

6. The user device of claim 1, wherein the eSIM stores the eSIM component at a first MNO profile so that the eSIM component is accessible only when the first MNO profile is active.

7. The user device of claim 1, wherein the eSIM stores the eSIM component at a third party security domain of the eSIM and is accessible by any active MNO profile.

8. A method, comprising:
storing, at an embedded Subscriber Identity Module (eSIM), one or more Mobile Network Operator (MNO) profiles, at least one of which is an active MNO profile;
storing, at the eSIM, an eSIM component of a digital passport application that acts on behalf of an entity;

obtaining, by a physical processor executing an interface component of the digital passport application, the active MNO profile from the eSIM;

receiving, by the physical processor, from the entity, a request to obtain a listing of one or more blockchain-based services available through an MNO associated with the active MNO profile;

receiving, by the physical processor, from the MNO, a redirection to an edge digital gate that is entitled to provide access to the one or more blockchain-based services; and connect to the edge digital gate based on the redirection.

9. The method of claim 8, further comprising:

receiving, from the edge digital gate, the listing of the one or more blockchain-based services;

receiving, from the entity, a selection of at least a first blockchain-based service from among the one or more blockchain-based services;

transmitting a request to enroll in the first blockchain-based service, the request including a first virtual identifier linked to the entity and corresponding to the first blockchain-based service;

receiving an access token from the edge digital gate, the access token being indicative of an authorization to access the first blockchain-based service; and digitally signing the access token and store the digitally signed access token via the eSIM component for accessing the first blockchain-based service.

10. The method claim 9, wherein the digital passport application uses a digital persona comprising a physical identifier of the entity, a digital identifier bound to the physical identifier, and one or more virtual identifiers, including the first virtual identifier, each linked with the digital identifier and each associated with a corresponding blockchain-based service.

11. The method of claim 10, the method further comprising:

binding, by the digital passport application, the physical identifier to the digital identifier via a private key of the entity and links the digital identifier with each of the one or more virtual identifiers via a public key of the entity.

12. The method of claim 9, further comprising:

transmitting the digitally signed access token to the edge digital gate for accessing the first blockchain-based service; and receiving an indication that a transaction associated with accessing the first blockchain-based service has been closed.

13. The method of claim 8, further comprising:

storing, at the eSIM, the eSIM component at a first MNO profile so that the eSIM component is accessible only when the first MNO profile is active.

14. The method of claim 8, further comprising:

storing, at the eSIM, the eSIM component at a third party security domain of the eSIM so that the eSIM component is accessible by any active MNO profile.

15. A computer readable storage medium comprising instructions, when executed on a user device, programs the user device to:

obtain an active Mobile Network Operator (MNO) profile from an embedded Subscriber Identity Module (eSIM), wherein the eSIM stores an eSIM component of a digital passport application that acts on behalf of an entity;

responsive to execution of an interface component of the digital passport application, receive, from the entity, a request to obtain a listing of one or more blockchain-based services available through an MNO associated with the active MNO profile;

receive, from the MNO, a redirection to an edge digital gate that is entitled to provide access to the one or more blockchain-based services; and connect to the edge digital gate based on the redirection.

16. The computer readable storage medium of claim 15, the instructions further programming the user device to:

receive, from the edge digital gate, the listing of the one or more blockchain-based services;

receive, from the entity, a selection of at least a first blockchain-based service from among the one or more blockchain-based services;

transmit a request to enroll in the first blockchain-based service, the request including a first virtual identifier linked to the entity and corresponding to the first blockchain-based service;

receive an access token from the edge digital gate, the access token being indicative of an authorization to access the first blockchain-based service; and digitally sign the access token and store the digitally signed access token via the eSIM component for accessing the first blockchain-based service.

17. The computer readable storage medium of claim 16, wherein the digital passport application uses a digital persona comprising a physical identifier of the entity, a digital identifier bound to the physical identifier, and one or more virtual identifiers, including the first virtual identifier, each linked with the digital identifier and each associated with a corresponding blockchain-based service.

18. The computer readable storage medium of claim 17, wherein the digital passport application binds the physical identifier to the digital identifier via a private key of the entity and links the digital identifier with each of the one or more virtual identifiers via a public key of the entity.

19. The computer readable storage medium of claim 15, the instructions further programming the user device to:

transmit the digitally signed access token to the edge digital gate for accessing the first blockchain-based service; and receive an indication that a transaction associated with accessing the first blockchain-based service has been closed.

20. The computer readable storage medium of claim 14, wherein the eSIM stores the eSIM component at a first MNO profile so that the eSIM component is accessible only when the first MNO profile is active.

* * * * *